United States Patent
Elsaadani et al.

(10) Patent No.: US 9,299,482 B2
(45) Date of Patent: Mar. 29, 2016

(54) OPTICAL ELECTRICAL HYBRID CABLE

(71) Applicants: Asaad R. Elsaadani, Meriden, CT (US); Thomas McKeon, Wallingford, CT (US); Erhard Mahlandt, Laatzen (DE); Otto Schumacher, Sarstedt (DE); Robert Scott, Hamden, CT (US); Robert Mangiulli, Cheshire, CT (US)

(72) Inventors: Asaad R. Elsaadani, Meriden, CT (US); Thomas McKeon, Wallingford, CT (US); Erhard Mahlandt, Laatzen (DE); Otto Schumacher, Sarstedt (DE); Robert Scott, Hamden, CT (US); Robert Mangiulli, Cheshire, CT (US)

(73) Assignee: ALCATEL-LUCENT SHANGHAI BELL CO. LTD., Shanghai (CN)

( * ) Notice: Subject to any disclaimer, the term of this patent is extended or adjusted under 35 U.S.C. 154(b) by 329 days.

(21) Appl. No.: 13/931,060

(22) Filed: Jun. 28, 2013

(65) Prior Publication Data

US 2015/0003794 A1    Jan. 1, 2015

(51) Int. Cl.
*H01B 11/22* (2006.01)
*G02B 6/44* (2006.01)
*H01B 13/016* (2006.01)

(52) U.S. Cl.
CPC .............. *H01B 11/22* (2013.01); *G02B 6/4416* (2013.01); *G02B 6/4471* (2013.01); *H01B 13/016* (2013.01); *Y10T 29/49123* (2015.01)

(58) Field of Classification Search
CPC ..................................................... G02B 6/4293
See application file for complete search history.

(56) References Cited

U.S. PATENT DOCUMENTS

| 4,775,212 A | 10/1988 | Smith |
| 5,315,063 A | 5/1994 | Auclair |
| 6,169,251 B1 * | 1/2001 | Grant et al. ............... 174/113 R |
| 6,479,607 B1 * | 11/2002 | Milan et al. ................ 526/317.1 |
| 8,440,909 B2 * | 5/2013 | Van Der Meer .......... 174/113 R |
| 2014/0138151 A1 * | 5/2014 | Islam .......................... 174/71 R |
| 2014/0140671 A1 * | 5/2014 | Islam ............................ 385/101 |
| 2014/0355941 A1 * | 12/2014 | Burris et al. .................. 385/101 |

FOREIGN PATENT DOCUMENTS

DE    20 2007 010626    11/2007

* cited by examiner

*Primary Examiner* — Michelle R Connelly
(74) *Attorney, Agent, or Firm* — Capitol Patent & Trademark Law Firm, PLLC

(57) ABSTRACT

A hybrid cable for telecommunications systems is disclosed. The hybrid cable may include a plurality of fiber-optic cables and power cables extending within an armor member and an outer jacket in a main body portion of the hybrid cable, and extending outside of the armor member and the outer jacket in a termination portion of the hybrid cable. Shielded tube assemblies may be attached to the power cables in the termination portion to provide electrical shielding to the power cables in the termination portion of the hybrid cable. The shielded tube assemblies may be attached to the armor member to electrically ground the shielded tube assemblies. A method of constructing a hybrid cable is also disclosed.

16 Claims, 5 Drawing Sheets

OPTICAL ELECTRICAL HYBRID CABLE

BACKGROUND OF THE INVENTION

Known hybrid cables include a plurality of telecommunication fiber-optic cables and a plurality of electrical power cables within a single outer cable jacket. Such hybrid cables may be used as feeder cables in cellular systems to connect base stations (BTSs/NodeBs/eNodeBs) to transceivers or remote radio heads (RRHs), thereby providing power to RRHs and supporting radio frequency (RF) signal transmissions to and from RRHs.

FIG. 1 shows a conventional hybrid cable 1. The cable 1 includes a main body portion 1a and a termination portion 1b adjacent to the main body portion 1a at an end of the hybrid cable 1. The termination portion 1b may be used to connect the hybrid cable 1 to a transceiver or RRH (not shown), for example. Another termination portion (not shown) may be provided at an opposite end (not shown) of the hybrid cable 1 for connecting the hybrid cable 1 to a base station, for example.

Continuing with reference to FIG. 1, the hybrid cable 1 includes a plurality of fiber-optic cable pairs 10 including a first fiber-optic cable 12 and a second fiber-optic cable 14, and a plurality of DC power cable pairs 20 including a first power cable 22 of a first polarity and a second power cable 24 of a second polarity. At the main body portion 1a of the hybrid cable 1, the fiber-optic cable pairs 10 and the power cable pairs 20 are disposed within a main jacket 2. The plurality of fiber-optic cables 10 are further retained within a fiber-optic cable jacket or channel 6 inside of the main jacket 2. An armor member 4 is disposed within the main jacket 2 throughout the main body portion 1a, and surrounds the fiber-optic cable jacket or channel 6 and the power cable pairs 20.

The termination portion 1b includes a transition section T adjacent to the main body portion 1a that provides a protective transition region between the main body portion 1a and the termination portion 1b. The armor member 4 terminates part way through the transition section T. The fiber-optic cable pairs 10 and the power cable pairs 20 extend axially beyond the armor member 4 from the area at which the armor member 4 terminates. A first, main break-out boot 30 may be attached to the outer jacket 2 at an end of the main body portion 1a of the hybrid cable 1, and may cover the armor member 4, the fiber-optic cable pairs 10 and the power cable pairs 20 at the transition section T. The main break-out boot 30 defines one or more openings 32 through which the fiber-optic cable pairs 10 and the power cable pairs 20 extend outside of the main jacket 2, the armor member 4 and the main break-out boot 30 in the termination portion 1b of the hybrid cable 1. The power cable pairs 20 extend separately from each other at the termination portion 1b of the hybrid cable 1. A second, fiber-optic cable break-out boot 40 may be attached to an end of the fiber-optic cable jacket 6 at the termination portion 1b, outside of the opening(s) 32 of the main break-out boot 30. The second break-out boot 40 may include one or more openings 42 through which the fiber-optic cable pairs 10 extend separately from each other outside of the fiber-optic cable jacket or channel 6.

A fiber-optic connector 50 may be attached to the end of each fiber-optic cable 10 at the end portion 1b of the hybrid cable 1 for connecting each fiber-optic cable pair 10 to a RRH. Each of the power cable pairs 20 may be connected to a 'RRH by a respective power cable connector (not shown) at the end portion 1b of the hybrid cable 1. Additional shielding and grounding components (not shown) may be added to each of the power cable pairs 20 at the termination portion 1b of the hybrid cable 1.

The additional shielding added to each of the power cable pairs 20 at the termination portion 1 of the hybrid cable 1 presents a challenge with regard to joining the armor member 4 to the additional shielding to maintain full shielding and grounding throughout the hybrid cable 1. One existing solution to this problem is to use power cable pairs 20 that are individually shielded throughout their entire lengths. However, providing such full-length shielding is expensive and adds substantial weight to the hybrid cable 1, increases the size (diameter) of the hybrid cable 1, and adds significant expense to manufacturing the hybrid cable 1.

An alternative existing solution to the problem of joining the armor member 4 to the additional shielding in the termination portion 1b is to bond shielding components in the termination portion 1b to the armor member 4 through welded connections. However, this solution requires welding of dissimilar metals and subjects the heat-sensitive fiber-optic cables 12, 14 to a high amount of heat.

In view of the above, it is desirable to provide an optical electrical hybrid cable that provides effective shielding and grounding of power cables where the power cables extend outside of a main jacket of the hybrid cable. It is further desirable to provide such a hybrid cable using a minimum amount of additional shielding material in order to minimize the size, weight and cost of the hybrid cable.

SUMMARY OF THE INVENTION

The disclosure is directed at an improved hybrid cable that can be used, for example, in cellular telecommunication systems to connect base stations (BTSs/NodeBs/eNodeBs) to transceivers or remote radio heads (RRHs). The disclosed hybrid cable includes an improved construction for shielding power cables in a termination portion of the hybrid cable, and grounding shielding components in the termination portion of the hybrid cable. The disclosure further provides a method of constructing the hybrid cable.

According to an embodiment of the invention, a hybrid cable may include: a main body portion, and a termination portion adjacent to the main body portion at an end of the hybrid cable for connecting the hybrid cable to a device. The hybrid cable may include a conductive armor member extending in the main body portion, and an outer jacket disposed around the conductive armor member in the main body portion. The hybrid cable may include one or more pairs of fiber-optic cables configured to transmit RF signals and one or more power cables configured to transmit power signals. The one or more fiber-optic cables and the one or more power cables may extend within the conductive armor member and the outer jacket throughout the main body portion, and may extend outside of the conductive armor member and the outer jacket in the termination portion. The hybrid cable may further include one or more shielded tube assemblies in the termination portion. Each shielded tube assembly may be attached to a respective pair of power cables and may be configured to electrically shield the respective pair of power cables. Each shielded tube assembly may be electrically grounded to the armor member.

According to another embodiment, a method of constructing a hybrid cable is provided. The method may include: arranging a conductive armor member to extend in a main body portion; arranging an outer jacket around the conductive armor member in the main body portion; arranging one or more pairs of fiber-optic cables to extend within the conductive armor member and the outer jacket throughout the main body portion, and to extend outside of the conductive armor member and the outer jacket in a termination portion of the hybrid cable adjacent to the main body portion; and arranging one or more pairs of power cables to extend within the conductive armor member and the outer jacket throughout the main body portion, and to extend outside of the conductive armor member and the outer jacket in the termination portion. The method may include arranging one or more shielded tube assemblies in the termination portion by attaching each shielded tube assembly to a respective pair of power cables to electrically shield the respective pair of power cables. The method may further include electrically grounding each shielded tube assembly to the armor member.

Additional features and advantages of the invention will be apparent to those skilled in the art based on the following detailed description and appended drawings.

DETAILED DESCRIPTION OF THE INVENTION

Figure 1:
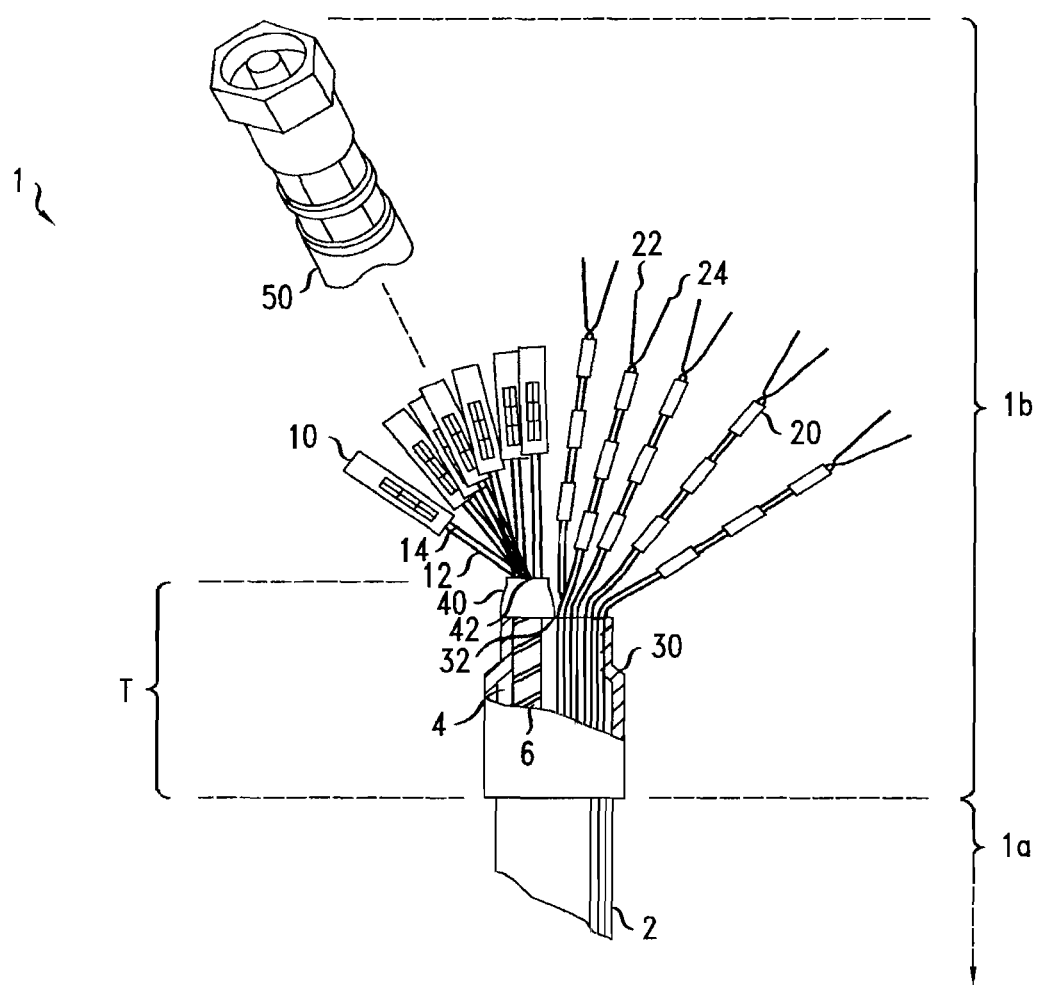
FIG. 1 shows an exploded, partial cross-sectional view of a conventional hybrid cable.

The following description discloses an exemplary hybrid cable. The hybrid cable may be used for connecting a remote radio head (RRH) to a base station (BTS/NodeB/eNodeB) in a cellular telecommunication network, for example. However, it should be understood that the cable described herein merely represents an exemplary embodiment of the invention, and that variations of the specific embodiment are possible within the scope of the invention. Furthermore, hybrid cables according to the disclosure may be used for connecting equipment or devices other than RRHs and base stations, and may further be used in applications other cellular telecommunication networks.

It is noted that, throughout the following description and appended drawings, the same reference numerals and characters refer to the same elements, features and structures.

Figure 2:
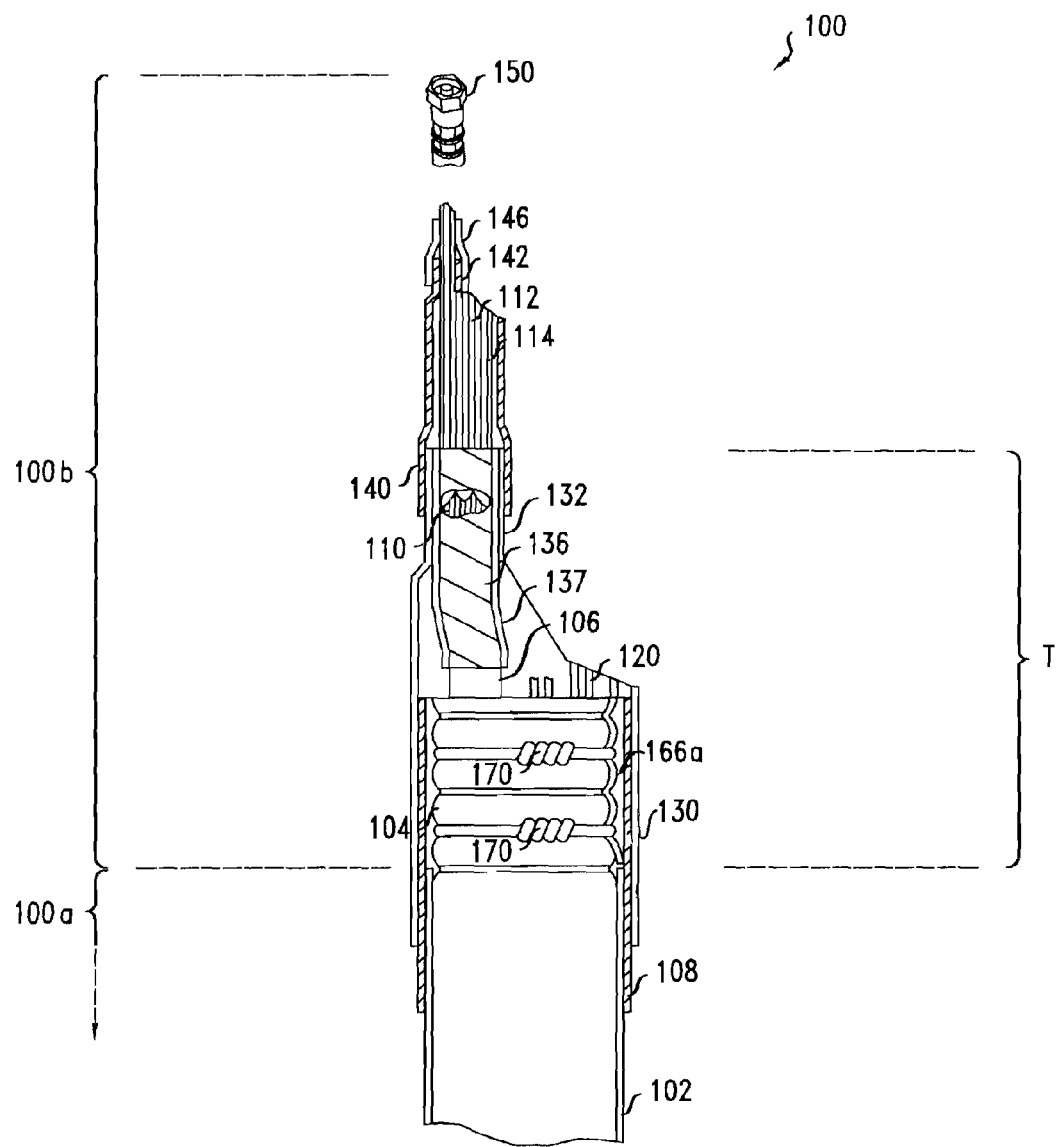
FIGS. 2 and 3 show exploded, partial cross-sectional views of a hybrid cable according to an embodiment of the invention, with FIG. 2 providing a detailed view of fiber-optic cable components of the hybrid cable and FIG. 3 providing a detailed view of power cable components of the hybrid cable.
Figure 3:
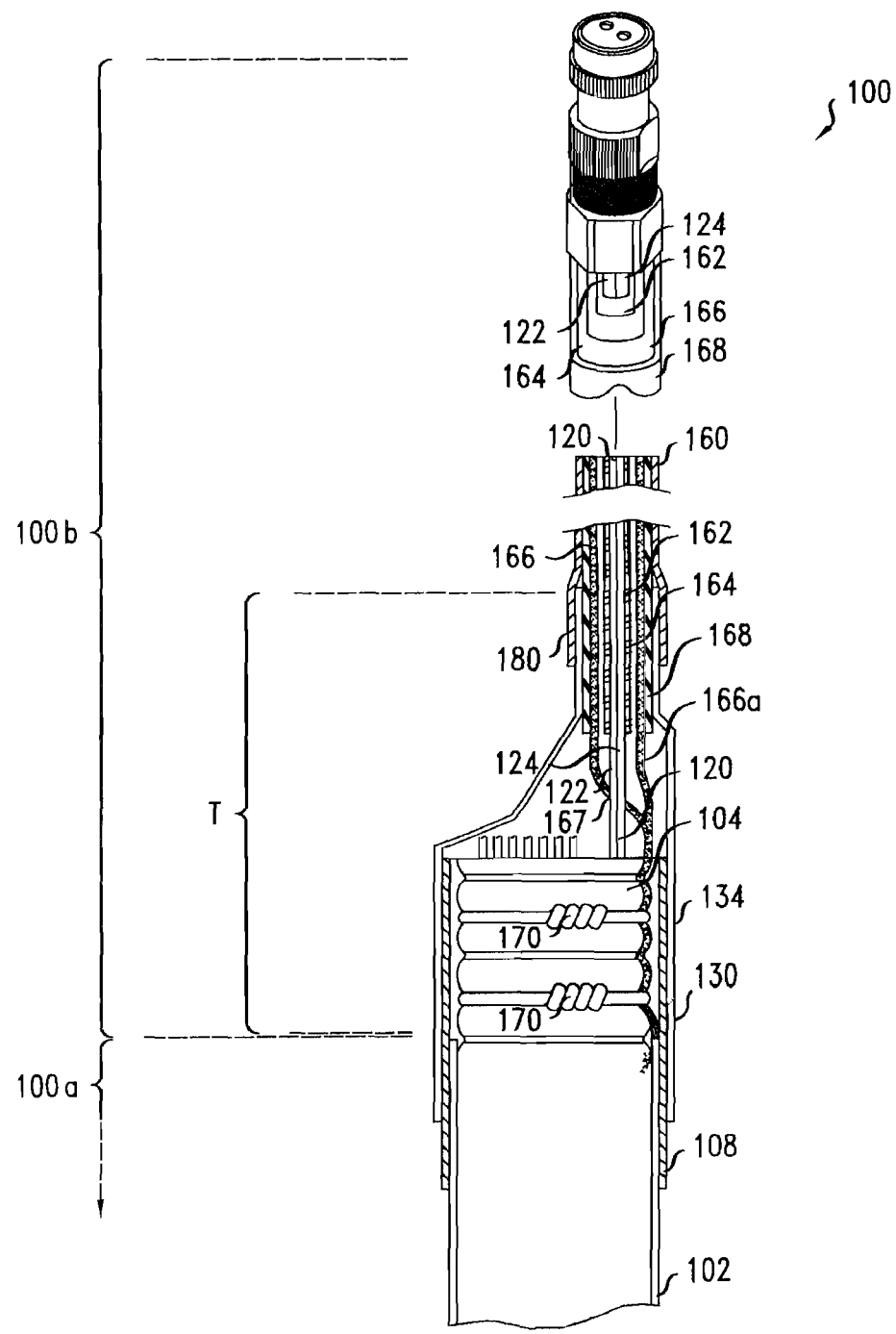

FIGS. 2 and 3 show a novel hybrid cable 100, according to an embodiment of the invention. FIG. 2 shows details related to fiber-optic cable components of the hybrid cable 100, while FIG. 3 shows details related to power cable components of the hybrid cable 100. As shown in FIGS. 2 and 3, the cable 100 may include a main body portion 100a and a termination portion 100b at an end of the hybrid cable 100. The termination portion 100b may be used to connect the hybrid cable 100 to a RRH (not shown), for example. Another termination portion (not shown) may be provided at an opposite end (not shown) of the hybrid cable 100 for connecting the hybrid cable 100 to a base station, for example.

The hybrid cable 100 may include a plurality of fiber-optic cable pairs 110 (FIG. 2) and a plurality of DC power cable pairs 120 (FIG. 3). As illustrated in FIG. 2, each of the fiber-optic cable pairs 110 may include a first telecommunication fiber-optic cable 112 and a second telecommunication fiber-optic cable 114. As illustrated in FIG. 3, each of the power cable pairs 120 may include a first electrical power cable 122 of a first polarity and a second electrical power cable 124 of a second polarity. The first and second power cables 122, 124 may be constructed of copper wire, for example. According to one embodiment of the invention, the hybrid cable 100 may include six fiber-optic cable pairs 110 and five power cable pairs 120. However, other quantities of fiber-optic cable pairs and power cable pairs are possible.

Referring to FIGS. 2 and 3, the fiber-optic cable pairs 110 and the power cable pairs 120 may be disposed within a weatherproof main, outer jacket 102 and a tubular, conductive armor member 104 in the main body portion 100a of the hybrid cable 100. More specifically, the main jacket 102 may be disposed around the armor member 104, which may be disposed around the fiber-optic cable pairs 110 and the power cable pairs 120. The main jacket 102 may be constructed of a non-conductive, flexible material, such as a rubber, polymer, polyester or nylon, for example. The armor member 104 may be constructed of corrugated aluminum or another conductive material with a desirable combination of rigidity and flexibility. The armor member 104 may provide structural protection to the fiber-optic cables 112, 114 and the power cables 122, 124, and may additionally provide shielding and grounding to the power cables 122, 124. The main jacket 102 and the armor member 104 may extend throughout the entire main body portion 100a.

As shown in FIG. 2, the fiber-optic cable pairs 110 may be further retained within a fiber-optic cable jacket or channel 106 inside of the armor member 104. The fiber-optic cable jacket or channel 106 may be constructed of a non-conductive plastic material, for example.

Continuing with reference to FIGS. 2 and 3, the termination portion 100b may include a transition section T immediately adjacent to the main body portion 100a that provides a protective transition region between the main body portion 100a and the termination portion 100b. The armor member 104 may extend axially beyond the outer jacket 102 into the transition section T and may terminate part way through the transition section T. The fiber-optic cable pairs 110 (FIG. 2) and the power cable pairs 120 (FIG. 3) may extend axially beyond the armor member 104 in the transition section T. As shown in FIG. 2, the fiber-optic cable pairs 110 may remain within the fiber-optic cable jacket 106 within the transition section T. A portion of the fiber-optic cable jacket 106 in the transition section T may be wrapped with a high-temperature tape 136, which in turn may be covered by a securing sleeve or boot 137. The securing sleeve or boot 137 may be constructed of a rubber or plastic material, such as flame-retardant polyolefin with adhesive, for example.

A first, main break-out boot 130 may be attached to the outer jacket 102 at an end of the main body portion 1a of the hybrid cable 1, and may cover the armor member 104, the fiber-optic cable pairs 110 and the power cable pairs 120 at the transition section T. A securing sleeve or boot 108 may be disposed over the end of the outer jacket 102 at the end of the main body portion 100a for receiving the main break-out boot 130. The securing sleeve or boot 108 may be constructed of a rubber or plastic material, such as flame-retardant polyolefin with adhesive, for example. The securing sleeve or boot 108 may cover the armor member 104 in the transition section T. The main break-out boot 130 may be fitted onto the securing sleeve or boot 108, and may be retained thereon by an interference fit, adhesive, and/or crimping or clamping means, for example.

Figure 4:
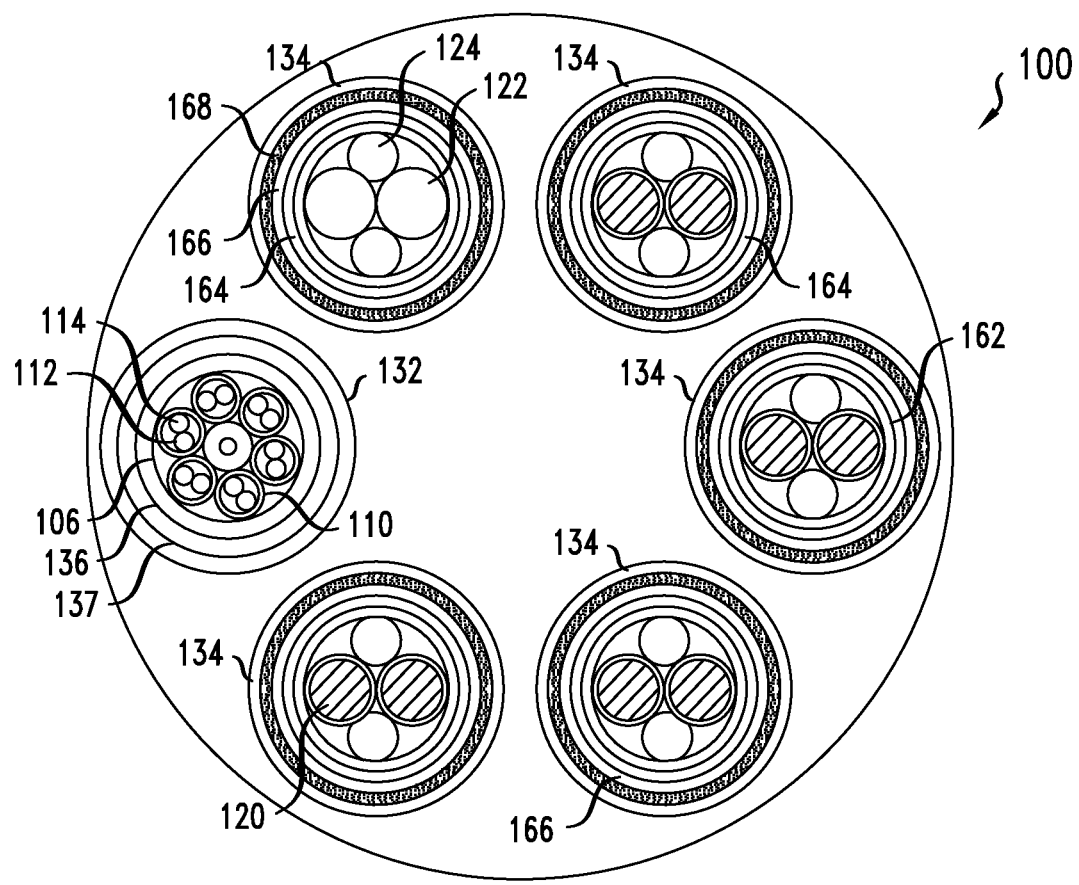
FIG. 4 is a top cross-sectional view of the hybrid cable, at a cross-section taken through fiber-optic cables and the power cables near an exit region of a main break-out boot of the hybrid cable.
Figure 5:
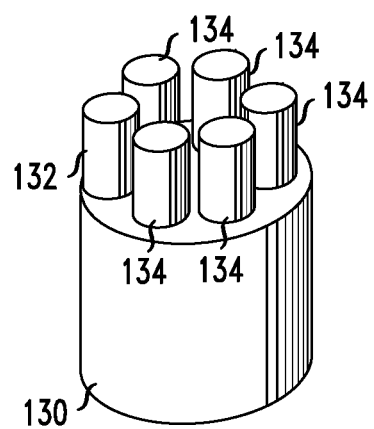
FIG. 5 is a perspective view of the main break-out boot.

As shown in FIGS. 4 and 5, the main break-out boot 130 may include a first port 132 that receives the fiber-optic cable pairs 110, and a plurality of second ports 134, each of which receives one of the power cable pairs 120. In the disclosed embodiment including five power cable pairs, the main break-out boot may include five, second ports 134. According to one embodiment, the ports 132, 134 may be hollow tubular members. The main break-out boot 130 may be constructed of a non-conductive material such as a plastic or rubber material, for example.

Turning back to FIG. 2, the fiber-optic cable pairs 110, contained within the high-temperature tape 136 and the securing sleeve or boot 137, may extend through the first port 132. The tape 136 and the securing sleeve or boot 137 may terminate at or near the exit of the port 132. Upon exiting the first port 132, the fiber-optic cable pairs 110 may break out, or extend outside of the main jacket 102, the armor member 104 and the main break-out boot 130 in the termination portion 100b.

A second, fiber-optic cable break-out boot 140 may be attached to the first port 132 of the main break-out boot 130. The second break-out boot 140 may be constructed of a non-conductive material such as a rubber or plastic, for example. The second break-out boot 140 may include one or more ports 142 that receive a respective fiber-optic cable pair 110. A boot or sleeve 146 may be connected to each port 142 for guiding a respective fiber-optic cable pair 110 as the fiber-optic cable pair 110 exits the port 142. In an embodiment including six fiber-optic cable pairs 110, the second break-out boot may include six ports 142. The fiber-optic cable pairs 110 may break out, or extend separately from respective ports 142 and sleeves 146, and may then be secured to respective fiber-optic connectors 150 for connecting the fiber-optic cable pairs 110 to a RRH, for example.

Figure 6:
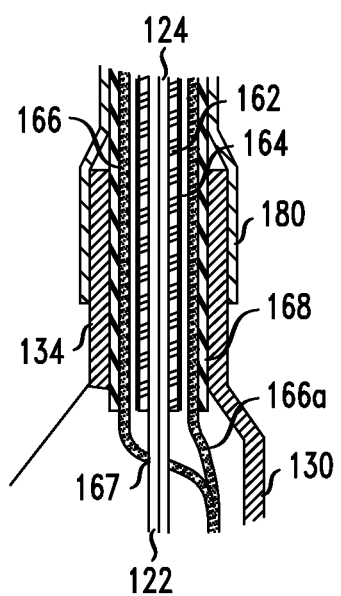
FIG. 6 shows a shielding and grounding assembly for the power cables at a termination region of the hybrid cable.

Turning to FIGS. 3 and 4, each power cable pair 120 may extend through a respective second port 134 of the main break-out boot 130. As best shown in FIGS. 3 and 6, a shielded tube assembly 160 may be secured around each power cable pair 120 from a desired area within the transition section T throughout a remainder of the termination portion 100b. A segment of the shielded tube assembly 160 may be secured within the second port 134 by an interference or friction fit, for example.

Referring to FIGS. 3 and 6, the shielded tube assembly 160 may include a hollow support tube 162 disposed around the power cable pair 120, a first conductive shielding member 164 disposed around and contacting the support tube 162, a second conductive shielding member 166 disposed around and contacting the first conductive shielding member 164 and a shielded tube assembly jacket 168 disposed around the second conductive shielding member 166. According to a preferred embodiment, the support tube 162 may be constructed of plastic, the first conductive shielding member 164 may be constructed of aluminum and the second conductive shielding member 166 may be constructed of tin copper. According to a most preferred embodiment, the first conductive shielding member 164 may be constructed of aluminum foil that is wrapped around the support tube 162, and the second conductive shielding member 166 may be constructed of a tin copper braid that is wrapped around the first conductive shielding member 164. According to an alternate embodiment, the hollow support tube 162 may be constructed of a conductive material such as aluminum and may form a first conductive shielding member (eliminating the need for a separate first conducting member 164), and the second conductive shielding member 166 may be disposed immediately around the support tube 162. The shielded tube assembly jacket 168 may be constructed of rubber, plastic, nylon, polyester or a polymer material, for example. The jacket 168 may have a smooth or corrugated surface. According to a preferred embodiment, the jacket 168 may be corrugated to provide a greater bending radius. Although exemplary materials and constructions are provided herein for the shielded tube assembly 160, other materials and constructions are possible.

Still referring to FIGS. 3 and 6, the second conductive shielding member 166 may include a portion 166a extending beyond the support tube 162, the first conductive shielding member 164 and the shielded tube assembly jacket 168 inside the main break-out boot 130. The power cable pair 120 may extend through a hole or opening 167 in a sidewall of the portion 166a of the second conductive shielding member 166, and may thereafter extend through a space 166b within the sidewall and inside the support tube 162. The portion 166a of the second conductive shielding member 166 may extend alongside the armor member 104 within the securing sleeve or boot 108. The portion 166a may be retained in contact with the armor member 104 by one or more conductive fastening members 170 in order to provide continuous electrical shielding and grounding to the power cables 122, 124 throughout the hybrid cable 100. The conductive fastening members 170 may be stainless steel bale wires, for example. The bale wires 170 may be tightly twisted down to clamp the second conductive shielding member 166 against the armor member 104 such that the bale wires and the second conductive shielding member 166 contact the armor member 104. The second conductive shielding member 166 may thereby be secured to the armor member 104, and between the first conductive shielding member 164 and the jacket 168.

Continuing with reference to FIGS. 3 and 6, a boot or sleeve 180 may be connected to each port 134 for guiding a respective power cable pair 120. The boot or sleeve 180 may be constructed of a non-conductive material, such as a rubber or plastic material, for example. The power cable pairs 120 may break out, or extend separately from each other through the respective ports 134 and boots 180 in the termination portion 100b, while being retained within their respective shielded tube assemblies 160. The power cable pairs 120, still contained within shielded tube assemblies 160, may then be secured to respective power cable connectors 190 for connecting the power cable pairs 120 to a RRH, for example.

The hybrid cable 100 may be constructed by a simple, cost-effective method. Generally speaking, the hybrid cable 100 may be constructed by:

arranging the armor member 104 to extend in the main body portion 100a;

arranging the outer jacket 102 around the armor member 104 in the main body portion 100a;

arranging the fiber-optic cable pairs 110 to extend within the armor member 104 and the outer jacket 102 throughout the main body portion 100a, and to extend outside of the armor member 104 and the outer jacket 102 in the termination portion 100b;

arranging the power cables pairs 120 to extend within the armor member 104 and the outer jacket 102 throughout the main body portion 100a, and to extend outside of the armor member 104 and the outer jacket 102 in the termination portion 100b; and arranging each shielded tube assembly 160 in the termination portion 100b by attaching each shielded tube assembly 160 to its respective power cable pair 120 to electrically shield the respective power cable pair 120; and electrically grounding each shielded tube assembly 160 to the armor member 104.

Each shielded tube assembly 160 may attached to its respective power cable pair 120 by: arranging the support tube 162 around the respective power cable pair 120; arranging the first conductive shielding member 164 around the support tube 162; arranging the second conductive shielding member 166 around the first conductive shielding member 164; and arranging the jacket 168 around the second conductive shielding member 166. The components 162, 164, 166, 168 of the shielded tube assembly 160 may optionally be fully assembled together prior to arranging the support tube 162 around the respective power cable pair 120. The power cable pair 120 may be inserted through the hole 167 in the sidewall of the second conductive shielding member 166 prior to arranging the support tube 162 around the power cable pair 120.

The disclosed hybrid cable 100 provides effective protection of the fiber optic cables 112, 114 and the power cables 122, 124 from environmental and physical damage, continuous shielding of the power cables 122, 124 and effective grounding of the shielded tube assemblies. Moreover, the features of the cable 100 can be provided without substantially increasing the size/diameter, weight or cost of conventional hybrid cables.

It should be understood that the disclosure merely provides exemplary embodiments of the invention. One of ordinary skill in the art will appreciate that changes and variations to the disclosed components, features and methods can be made without departing from the spirit and scope of the invention as set forth in the appended claims.

We claim:

1. A hybrid cable comprising:
a main body portion;
a termination portion adjacent to the main body portion at an end of the hybrid cable for connecting the hybrid cable to a device;
a conductive armor member extending in the main body portion;
an outer jacket disposed around the conductive armor member in the main body portion;
one or more pairs of fiber-optic cables configured to transmit RF signals, the one or more pairs of fiber-optic cables extending within the conductive armor member and the outer jacket throughout the main body portion, and extending outside of the conductive armor member and the outer jacket in the terminations portion;
one or more pairs of power cables configured to transmit power signals, the one or more pairs of power cables extending within the conductive armor member and the outer jacket throughout the main body portion, and extending outside of the conductive armor member and the outer jacket in the termination portion; and
one or more shielded tube assemblies in the termination portion, each shielded tube assembly being attached to a respective pair of power cables, and each assembly comprising:
an inner conductive support tube that is disposed around the respective pair of power cables and,
a conductive shielding member disposed around the inner conductive support tube to electrically shield the support tube and respective power cables, the conductive shielding member extending into the main body portion and contacting the armor member to provide grounding for the shielded tube assembly.

2. The hybrid cable of claim 1, wherein each shielded tube assembly comprises:
a jacket member disposed around the conductive shielding member.

3. The hybrid cable of claim 1, wherein the conductive shielding member comprises a braid.

4. The hybrid cable of claim 1, wherein:
the conductive shielding member comprises a braid; and
the braid is attached to the armor member by at least one conductive wire wrapped around the braid and the armor member, thereby electrically grounding the shielded tube assembly.

5. The hybrid cable of claim 1, wherein the respective pair of power cables extends through a hole in a sidewall of the conductive shielding member, and thereafter extends through a space within the sidewall and into the support tube.

6. The hybrid cable of claim 1, wherein the conductive support tube is constructed of aluminum and the conductive shielding member is constructed of tin copper.

7. the hybrid cable of claim 6, wherein the conductive shielding member comprises a tin copper braid.

8. The hybrid cable of claim 1, comprising a boot attached to an end of the outer jacket and disposed around the one or more pairs of fiber-optic cables and the one or more pairs of power cables in a section of the termination portion immediately adjacent to the main body portion, wherein a segment of each shielded tube assembly is secured in a respective port of the boot.

9. A method of constructing a hybrid cable, the method comprising:
arranging a conductive armor member to extend in a main body portion;
arranging an outer jacket around the conductive armor member in the main body portion;
arranging one or more pairs of fiber-optic cables to extend within the conductive armor member and the outer jacket throughout the main body portion, and to extend outside of the conductive armor member and the outer jacket in a termination portion of the hybrid cable adjacent to the main body portion;
arranging one or more pairs of power cables to extend within the conductive armor member and the outer jacket throughout the main body portion, and to extend outside of the conductive armor member and the outer jacket in the termination portion;
arranging one or more shielded tube assemblies in the termination portion by attaching each shielded tube assembly to a respective pair of power cables to electrically shield the respective pair of power cables, each shield tube assembly comprising an inner conductive support tube disposed around the respective pair of power cables and a conductive shielding member disposed around the inner conductive support tube, the conductive shielding member extending into the main body portion; and
electrically grounding each shielded tube assembly to the armor member by contacting the conductive shielding member to the armor member.

10. The method of claim 9, wherein attaching each shielded tube assembly to the respective pair of power cables comprises:
arranging a jacket member around the conductive shielding member.

11. The method of claim 9, wherein conductive shielding member comprises a braid.

12. The method of claim 9, wherein the conductive shielding member comprises a braid, and attaching the conductive shielding member to the armor member comprises tying at least one conductive wire around the braid and the armor member.

13. The method of claim 9, comprising inserting the respective pair of power cables through a hole in a sidewall of the conductive shielding member, through a space within the sidewall and into the support tube.

14. The method of claim 9, wherein the conductive support tube is constructed of aluminum and-the conductive shielding member is constructed of tin copper.

15. The method of claim 9, wherein the conductive shielding member comprises a tin copper braid.

16. The method of claim 9, further comprising:
   attaching a boot to an end of the outer jacket to cover the one or more pairs of fiber-optic cables and the one or more pair of power cables in a section of the termination portion immediately adjacent to the main body portion; and
   securing a segment of each shielded tube assembly in a respective port of the boot.

\* \* \* \* \*